US012561508B1

(12) United States Patent
Yerramsetty et al.

(10) Patent No.: US 12,561,508 B1
(45) Date of Patent: Feb. 24, 2026

(54) METHOD AND SYSTEM OF CONVERTING UNSTRUCTURED DIGITAL DOCUMENTS TO A STRUCTURE FORMAT USING A SECURE API

(71) Applicants: Venkata Sai Raman Yerramsetty, Bolingbrook, IL (US); Rama Krishna Pallelapati, Bengaluru (IN)

(72) Inventors: Venkata Sai Raman Yerramsetty, Bolingbrook, IL (US); Rama Krishna Pallelapati, Bengaluru (IN)

( * ) Notice: Subject to any disclaimer, the term of this patent is extended or adjusted under 35 U.S.C. 154(b) by 157 days.

(21) Appl. No.: 17/693,412

(22) Filed: Mar. 14, 2022

Related U.S. Application Data

(63) Continuation-in-part of application No. 17/376,152, filed on Jul. 14, 2021, now abandoned.

(60) Provisional application No. 63/051,382, filed on Jul. 14, 2020.

(51) Int. Cl.
| | |
|---|---|
| *G06F 40/103* | (2020.01) |
| *G06F 16/2458* | (2019.01) |
| *G06F 16/25* | (2019.01) |
| *G06F 40/242* | (2020.01) |
| *G06V 30/10* | (2022.01) |

(52) U.S. Cl.
CPC ........ *G06F 40/103* (2020.01); *G06F 16/2465* (2019.01); *G06F 16/254* (2019.01); *G06F 40/242* (2020.01); *G06V 30/10* (2022.01)

(58) Field of Classification Search
None
See application file for complete search history.

(56) References Cited

U.S. PATENT DOCUMENTS

| | | | | |
|---|---|---|---|---|
| 9,286,283 B1 * | 3/2016 | Wilczek | .............. | G06V 30/412 |
| 2009/0234818 A1 * | 9/2009 | Lobo | ....................... | G06F 16/93 |
| 2010/0174985 A1 * | 7/2010 | Levy | .................... | G06F 40/163 |
| | | | | 715/244 |
| 2017/0148140 A1 * | 5/2017 | Bellert | ................ | G06V 10/243 |
| 2020/0364451 A1 * | 11/2020 | Ammar | ................ | G06V 10/768 |
| 2021/0081661 A1 * | 3/2021 | Dabholkar | ............... | G06T 5/50 |
| 2021/0089712 A1 * | 3/2021 | Patton | ................... | G06F 40/186 |
| 2021/0090694 A1 * | 3/2021 | Colley | .................... | G16H 15/00 |
| 2022/0230020 A1 * | 7/2022 | Saeugling | ............ | G06V 10/267 |
| 2022/0301072 A1 * | 9/2022 | Wang | .................... | G06F 40/279 |

* cited by examiner

*Primary Examiner* — Christopher J Fibbi

(57) ABSTRACT

In one aspect, a computerized method for document extraction workflow for unstructured documents includes the steps of implementing a text mining operation on a set of digital documents the incoming documents. This is done by defining a document type of each digital document. Based on the document type, the method defines a set of data dictionaries to extract any data from each digital document. The method uses the defined set of data dictionaries to extract any data from each digital document.

1 Claim, 14 Drawing Sheets

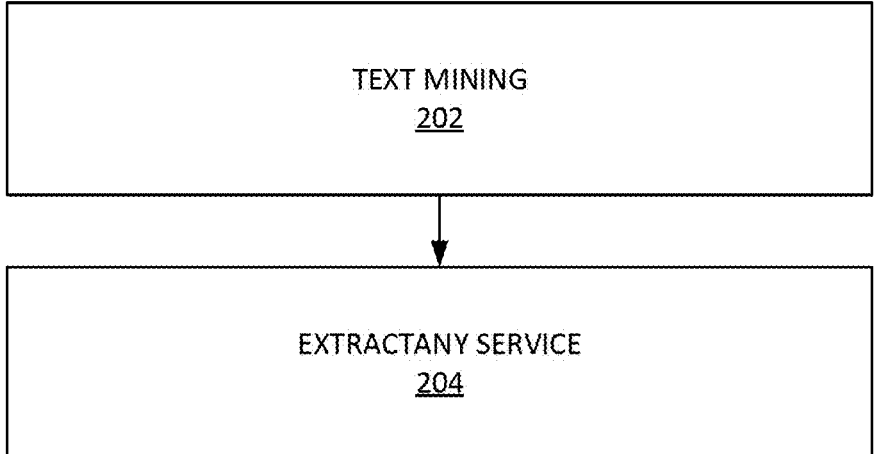
FIGURE 2

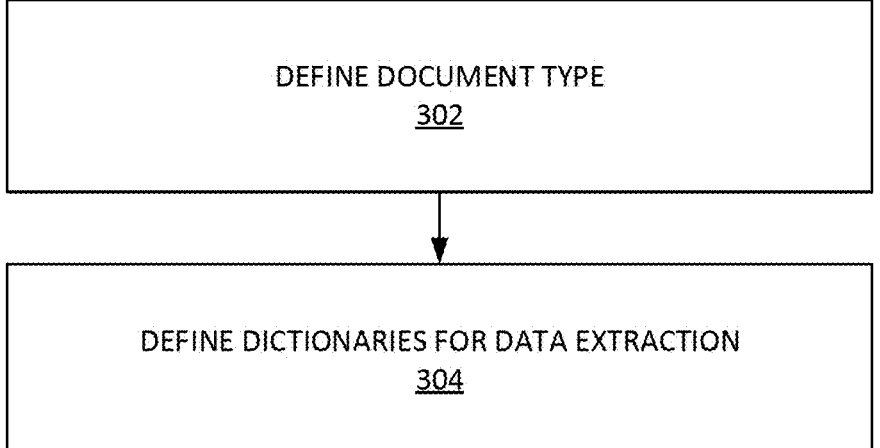
DEFINE DOCUMENT TYPE
302
DEFINE DICTIONARIES FOR DATA EXTRACTION
304
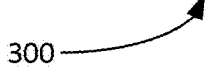
300
FIGURE 3

| Metadata item name | Description |
|---|---|
| Name | Document type name<br>Eg: Home owner's Policy |
| Version | Document version<br>(It can be any text depends on the provider/carrier) |
| Edition | Document Edition<br>(It can be any text depends on the provider/carrier) |
| Keywords | Unique list of some text words to identify the document |

FIGURE 4

| Metadata item name | Description | More information | |
|---|---|---|---|
| Name | Dictionary name, this can be the key name in the JSON | | |
| Data structure type | Structure of the table | • Text line(s)<br>• Tabular data | |
| Key words | Unique list of some text words to identify the start and end point in the document (This is for relative search) | • Starting text keywords<br>• Ending text keywords | This is start<br><br>| Name | Telephone | |<br>| John Doe | 55577854 | 55577855 |<br>| Joseph S | 66677854 | 577855 |<br>This is the end |
| Zones | Coordinates (x,y axis) of the text to be extracted (This is for fixed search) | • (x1,y1)<br>• (x2,y2) | Y-axis (x1,y1)<br>| Name | Telephone | |<br>| John Doe | 55577854 | 55577855 |<br>| Joseph S | 66677854 | 577855 |<br>(x2,y2)<br>X-axis |
| | | | |

FIGURE 5

| | Key Name | Start text | Include start text line? | End text | Include end text line? | Structure type (Mining type) | Column Names | Column Keywords | Column keyword references |
|---|---|---|---|---|---|---|---|---|---|
| Agency name | AgencyName | Agency Name | Yes | Agency Name | Yes | Text line | | | |
| Insured name | InsuredName | Insured Name | Yes | Insured Name | Yes | Text line | | | |
| LossRun Summary | LossRunSummary | Loss Run Summary | No | Totals | Yes | Table | Refer below | Refer below | Refer below |

FIGURE 7

| Dictionary name (key name) | Rule type | Rule info |
|---|---|---|
| AgencyName | Regex Extract | Name:.*Current |
| AgencyName | Replace text | Name: \|Current |
| InsuredName | Regex Extract | Name:.*Number |
| InsuredName | Replace text | Name: \|Number |
| LossRunSummary | Delete | |

FIGURE 8

EXTRACT DATA BY KEYWORD REFERENCES
902

EXTRACT DATA BY ZONE DEFINITION
904

IMPLEMENT ANGLE CORRECTION
906

IMPLEMENT SKEW CORRECTION
908

IMPLEMENTS AN OCR PROCESSOR
910

900

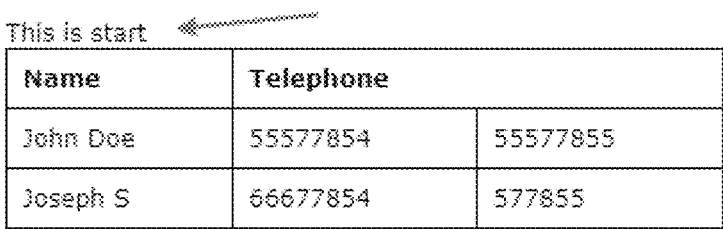
This is start
| Name | Telephone | |
|------|-----------|---|
| John Doe | 55577854 | 55577855 |
| Joseph S | 66677854 | 577855 |
This is the end
1000
FIGURE 10
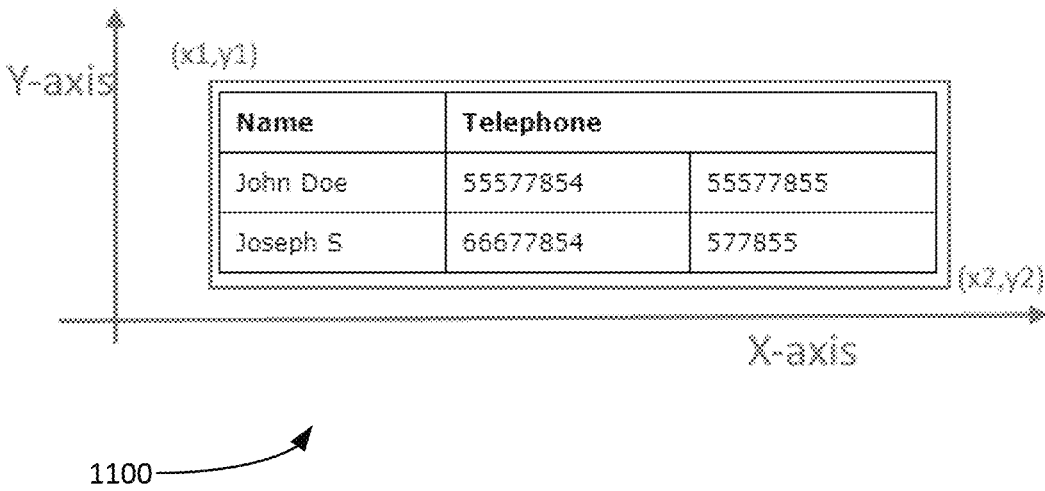
1100
FIGURE 11

1200

1400

| First column | Middle columns | Last column |
|---|---|---|
| • Extreme left side is the always starting position for the first column, refer ① in above picture <br> • The center position of the all next available positions will be the ending position for the first column, refer ② in above picture | • The center position of the all previous available positions will be the starting position for the middle columns, refer ② in above picture <br> • The center position of the all next available positions will be the ending position for the middle columns, refer ③ in above picture | • The center position of the all previous available positions will be the starting position for the last column, refer ③ in above picture <br> • Extreme right side is the ending position for the last column, refer ④ in above picture |

Figure 16:
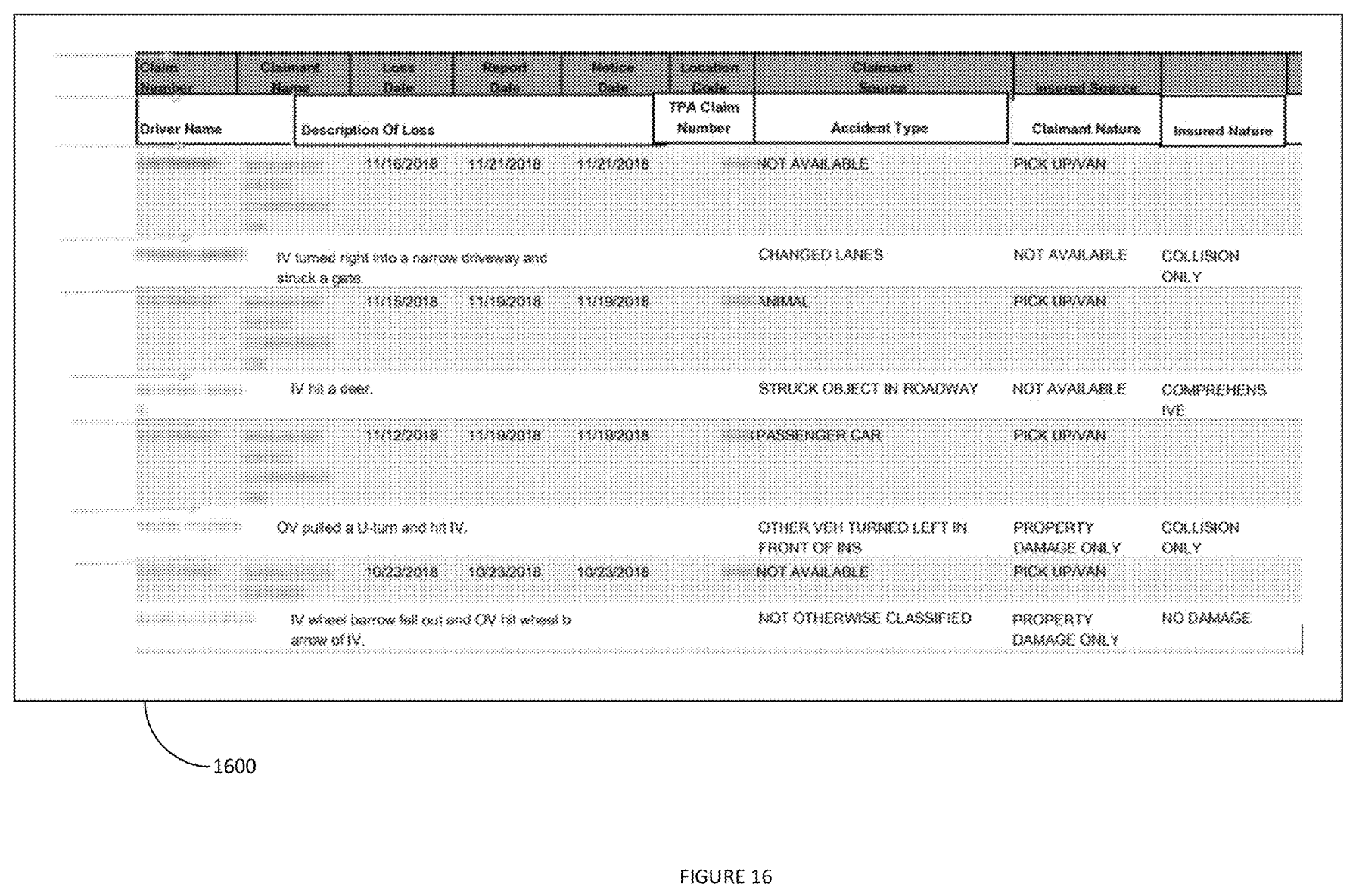

| Claim Number | Claimant Name | Loss Date | Report Date | Notice Date | Location Loss | Claimant Source | | |
| --- | --- | --- | --- | --- | --- | --- | --- | --- |
| | Driver Name | Description Of Loss | | | | TPA Claim Number | Accident Type | Claimant Nature | Insured Nature |
| | | 11/16/2018 | 11/21/2018 | 11/21/2018 | | | NOT AVAILABLE | PICK UP/VAN | |
| | | IV turned right into a narrow driveway and struck a gate. | | | | | CHANGED LANES | NOT AVAILABLE | COLLISION ONLY |
| | | 11/15/2018 | 11/16/2018 | 11/19/2018 | | | ANIMAL | PICK UP/VAN | PICK UP/VAN |
| | | IV hit a deer. | | | | | STRUCK OBJECT IN ROADWAY | NOT AVAILABLE | COMPREHENSIVE |
| | | 11/12/2018 | 11/19/2018 | 11/19/2018 | | | PASSENGER CAR | PICK UP/VAN | |
| | | OV pulled a U-turn and hit IV. | | | | | OTHER VEH TURNED LEFT IN FRONT OF INS | PROPERTY DAMAGE ONLY | COLLISION ONLY |
| | | 10/23/2018 | 10/23/2018 | 10/23/2018 | | | NOT AVAILABLE | PICK UP/VAN | |
| | | IV wheel barrow fell out and OV hit wheel barrow of IV. | | | | | NOT OTHERWISE CLASSIFIED | PROPERTY DAMAGE ONLY | NO DAMAGE |

METHOD AND SYSTEM OF CONVERTING UNSTRUCTURED DIGITAL DOCUMENTS TO A STRUCTURE FORMAT USING A SECURE API

CLAIM OF PRIORITY

This application is a continuation of and claims priority to U.S. patent application Ser. No. 17/376,152 filed Jul. 14, 2021, on and titled METHOD AND SYSTEM OF CONVERTING UNSTRUCTURED INSURANCE DOCUMENTS TO A STRUCTURE FORMAT USING A SECURE API. This provisional application is hereby incorporated by reference in its entirety.

U.S. patent application Ser. No. 17/376,152 claims priority to U.S. Provisional Patent Application No. 63/051,382 filed Jul. 14, 2020, on and titled METHOD AND SYSTEM OF CONVERTING UNSTRUCTURED INSURANCE DOCUMENTS TO A STRUCTURE FORMAT USING A SECURE API. This provisional application is hereby incorporated by reference in its entirety.

BACKGROUND

The application relates to structuring digital document(s) and text mining, and specifically converting unstructured digital documents to a structure format using a secure API.

Insurance documents such as policies, loss runs, statements of values, etc. vary widely from carrier to carrier, and submissions from clients may be in many different types of documents. These documents are often unstructured. Currently, these unstructured documents are manually reviewed by underwriters and insurance personal. The underwriters and insurance personal then manually input into the unstructured content into a structured format (if at all). The lack of efficiencies in the underwriting policy, risk review, and assessment of coverage gaps is extreme. Accordingly, improvements to the automation of review and extraction of information from unstructured insurance documents is desired.

BRIEF SUMMARY OF THE INVENTION

In one aspect, a computerized method for document extraction workflow for unstructured documents includes the steps of implementing a text mining operation on a set of digital documents the incoming documents. This is done by defining a document type of each digital document. Based on the document type, the method defines a set of data dictionaries to extract any data from each digital document. The method uses the defined set of data dictionaries to extract any data from each digital document.

BRIEF DESCRIPTION OF THE DRAWINGS

The present application can be best understood by reference to the following description taken in conjunction with the accompanying figures, in which like parts may be referred to by like numerals.

FIG. 2 illustrates an example document extraction workflow for unstructured documents, according to some embodiments.

FIG. 3 illustrates an example of implementing a text miner engine, according to some embodiments.

FIG. 4 illustrates an example table of example document type metadata items, according to some embodiments.

FIG. 5 illustrates an example table with a dictionary of metadata items, according to dome embodiments.

FIG. 7 illustrates an example table with a prepared dictionary, according to some embodiments.

FIG. 8 illustrates an example table comprising a set of rules, according to some embodiments.

FIG. 10 illustrates an example dictionary data structure that can be used herein, according to some embodiments.

FIG. 11 illustrates an example of extracting data by a zone definition, according to some embodiments.

FIGS. 14 and 15 illustrate a read/scan a table data from the file, according to some embodiments.

FIGS. 16 and 17 provide example screenshots for implementing an operation to Identify the horizontal separators, according to some embodiments.

Figure 1:
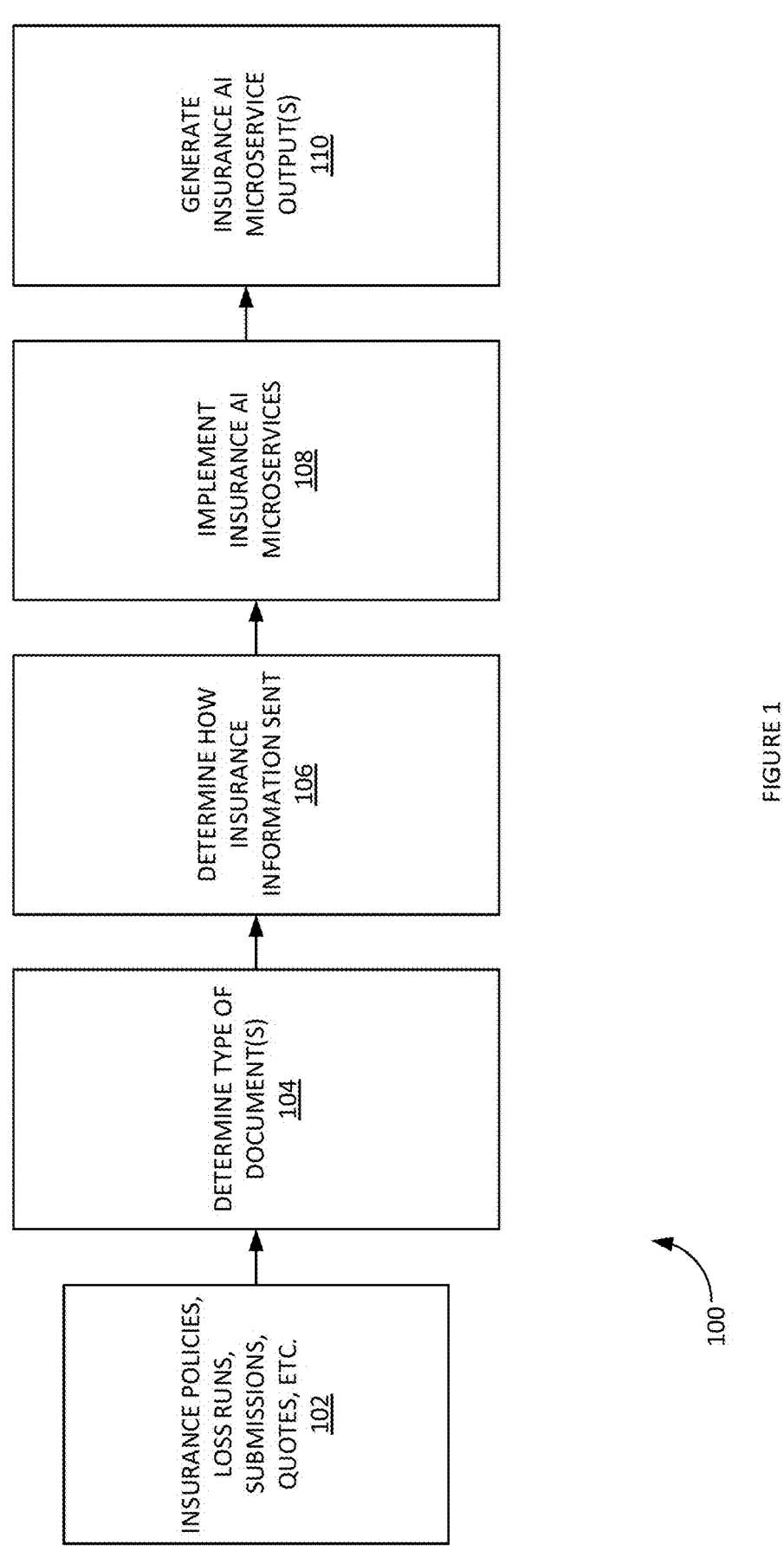
FIG. 1 illustrates an example process for converting unstructured insurance document to a structured output, according to some embodiments.

The Figures described above are a representative set, and are not an exhaustive with respect to embodying the invention.

DESCRIPTION

Disclosed are a system, method, and article of manufacture for converting unstructured insurance documents to a structure format using a secure API. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Application programming interface (API) is a computing interface which defines interactions between multiple software intermediaries.

Artificial intelligence (AI) is intelligence demonstrated by machines.

Data dictionary (i.e. 'dictionary') can be a set of metadata that contains definitions and representations of data elements (e.g. a read-only set of database tables and database views).

File Transfer Protocol (FTP) is a standard network protocol used for the transfer of computer files between a client and server on a computer network.

Javascript Object Notation (JSON) is an open standard file format, and data interchange format, that uses human-readable text to store and transmit data objects consisting of attribute-value pairs and array data types (and/or any other serializable value).

Loss run is a document that records the history of claims made against a commercial insurance policy.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Natural language processing (NLP) is a subfield AI that with the interactions between computers and human (natural) languages and concerns programing computers to process and analyze large amounts of natural language data. NLP can utilize speech recognition, natural language understanding, natural language generation, etc.

Optical character recognition or optical character reader (OCR) is the electronic or mechanical conversion of images of typed, handwritten, or printed text into machine-encoded text, whether from a scanned document, a photo of a document, a scene-photo.

Portable Document Format (PDF) is a file format to present documents, including text formatting and images, in a manner independent of application software, hardware, and operating systems.

Tesseract is an OCR engine.

Text mining can include information extraction, text data mining, etc. Text mining can include scanning a set of documents written in a natural language and modeling the document set for predictive classification purposes; populate a database or search index with the information extracted; etc. Text mining can include, inter alia: text categorization, text clustering, concept/entity extraction, production of granular taxonomies, sentiment analysis, document summarization, entity relation modeling, etc.

Exemplary Methods

Disclosed are methods of converting unstructured insurance documents (e.g. insurance policies, loss runs, submissions, ACORD, statement of values) that are in various formations (e.g. PDF, Scanned Images, Excel, Doc, Emails, etc.) to a structure using a secure API. These methods can be used to provide powerful insights by enriching extracted data with various data sources (e.g. third-party data sources such as: submission insights, policy insights with coverage gaps, etc.). An AI Platform (e.g. an ExtractAny platform, etc.) can review hundreds of pages of data and place it into a structured form housed on a cloud-computing platform server.

FIG. 1 illustrates an example process 100 for converting unstructured insurance document to a structured output, according to some embodiments. It is noted that process 100 can be applied to various set of unstructured digital documents and insurance digital documents are used herein by way of example. In the context of the insurance digital documents example, in step 102 process 100 can obtain the information to be processed. This can include, inter alia: insurance policies, loss runs, submissions, quotes, etc. In step 104, process 100 can determine the type of document(s) to be processed. The type of documents to be processed can include, inter alia: PDF documents, word processing documents, images of scanned documents, spreadsheet documents, multi-type document bundles, etc.

In step 106, process 100 can determine how the insurance information of step 102 has been communicated to a server system implementing process 100. In step 108, using the information obtained from implement insurance AI microservices (e.g. see Appendix A of U.S. Provisional Patent Application No. 63/051,382, etc.). generate insurance ai microservice output(s).

FIG. 2 illustrates an example document extraction workflow for unstructured documents, according to some embodiments. In step 202, process 200 can implement text mining operations on the incoming documents such as those obtain in step 102. Step 202 can be implemented by a text miner engine. FIG. 2 illustrates an example document extraction workflow for unstructured documents, according to some embodiments. The text miner engine can implement documents training. The text minder engine can utilize a Windows® UI tool.

FIG. 3 illustrates an example of implementing a text miner engine, according to some embodiments. In step 302, process 300 can define a document type. Step 302 can provide the following data to identify the different document, including, inter alia: loss runs, policies, submissions, lienholder notifications, insurance quotes, etc.

FIG. 4 illustrates an example table 400 of example document type metadata items, according to some embodiments. Table 400 can be used to implement step 302.

In step 304, process 300 can define dictionaries for data extraction. Step 304 can define the dictionaries to extract the data from the files.

FIG. 5 illustrates an example table 500 with a dictionary of metadata items, according to dome embodiments.

Figure 6:
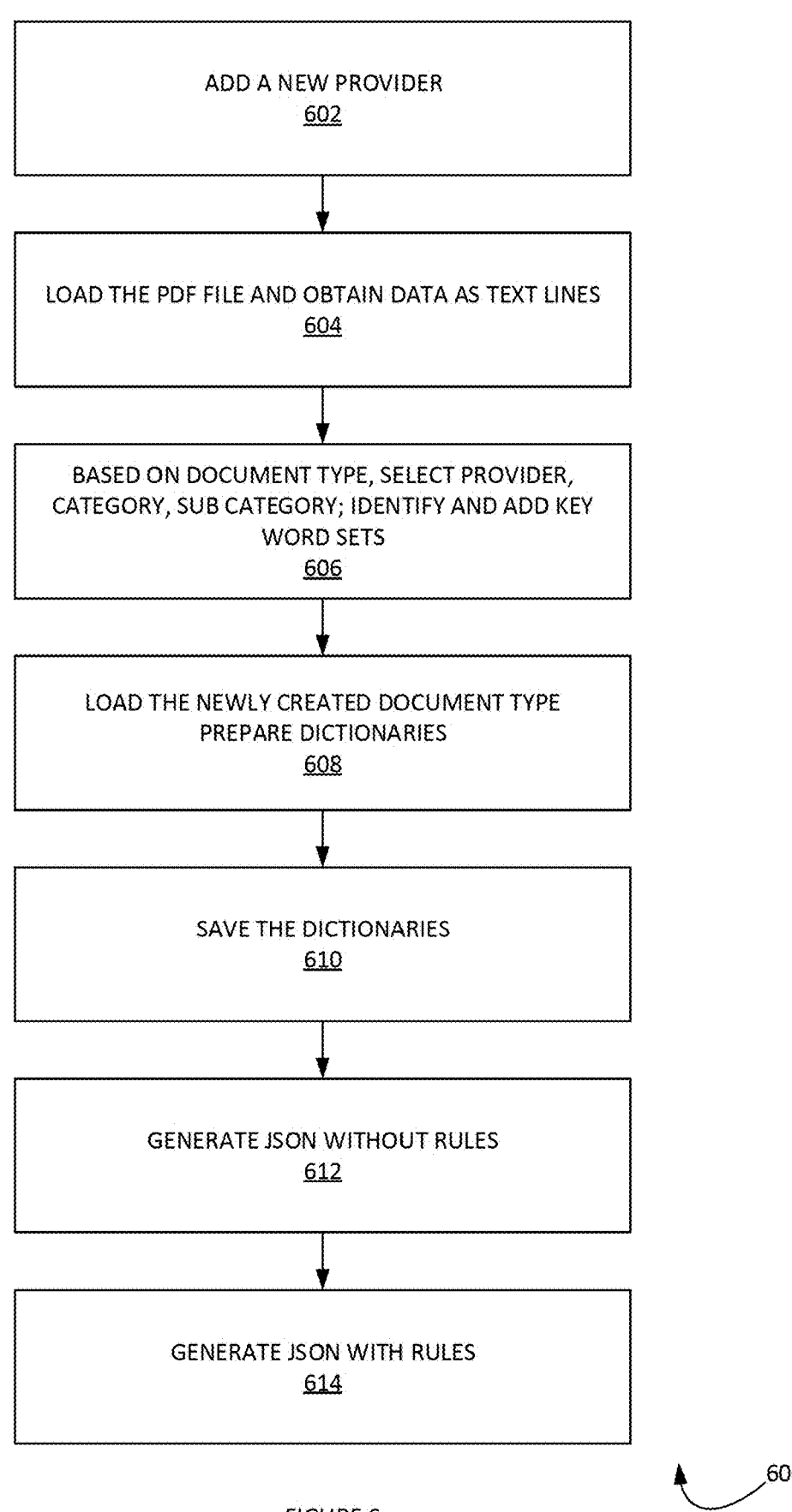
FIG. 6 illustrate an example process for text miner tool/engine to train/create document dictionaries, according to some embodiments.

FIG. 6 illustrate an example process for text miner tool/engine to train/create document dictionaries, according to some embodiments. In step 602, process 600 can add a new provider. In step 604, process 600 can load the PDF file and obtain data as text lines. For example, process 600 can automatically open in a text and source code editor (Notepad or Notepad++ (e.g. depending on machine configuration, etc.)).

In step 606, process 600 can, based on document type, select a provider, category, subcategory. Step 606 can also identify and add key word sets. Process 600 can select provider, category, subcategory. Process 600 can add a new document type (e.g. Loss runs). Process 600 can identify and add key word sets. For example, set 1: CHUBB^LOSS RUN REPORT^BUSINESS LOSS RUN and Set 2: CHUB-B^LOSS RUN REPORT^Loss Run Summary^Loss Run Detail.

Process 600 can identify the data that to be extracted. In step 608, process 600 can load the newly created document type and prepare the dictionaries. These can include, inter alia: AgencyName, InsuredName, LossrunSummary.

It is noted that the set of prepared set of dictionaries can be converted to a JSON file. For example, the system can pickup each dictionary and collect the corresponding identified 'Text' based on the definitions given for that dictionary, after completion of collecting all the text for all dictionaries system prepares a JSON text and saves into a file.

FIG. 7 illustrates an example table 700 with a prepared dictionary, according to some embodiments. An example LossrunSummary is now provided.

Lossrun Summary:

Column names: PolicyNumber|PolicyTerm|PolicyType-|NoofClaimsorOccurrences|LossandExpenseReserves-|Los sesPaid|ExpensesPaid|LossesandExpensesPaid-|Recovery|TotalIncurred Column keywords: 0!#^0~0!Policy^1<F|0!Term^0~0!Policy^2<F|0!Type^0~0!No^0<F|1!Claims^0<F~0!Loss^0|0!Expense^0<L~0!Losses^0|0!Paid^0<L~0!Expenses^0|0!Paid^1<L~1!Expenses^0<F|1!Paid^0<L~0!Recovery^0<L|0!Recovery^0<L~0!Total^0|0!/Total^0

Column keyword references: Policy # Policy Term Policy Type No of Loss|Claims/Occurrences Reserves Expenses.

In step 610, save the dictionaries. In step 612, process 600 can generate JSON without rules. It is noted that Raw JSON (e.g. without rules) can be as follows. Raw JSON can be the very first result which will contains unnecessary information and/or partly information and/or junk information. It is noted that Clean JSON (e.g. with applying the rules) can be as follows. Clean JSON can be the final result after applying the cleanup rules, these cleanup rules include removing the unnecessary information, removing the junk information, merging two or more information to form up the meaningful information, formatting the information, adding, or removing JSON keys situationally etc.

Process 600 can create rules and save them. FIG. 8 illustrates an example table 800 comprising a set of rules, according to some embodiments. According, in step 614, process 600 can generate JSON with rules.

Returning to process 200, in step 204, process 200 can implement the extract any service on the output of step 202. Step 204 extracts the data from any given file as per the dictionaries which are defined in by the text miner tool/engine. It is noted that a document extraction block diagram is provided in Appendix A of U.S. Provisional Patent Application 63/051,382. Process 200 can leverage this system to implement document extraction.

Figure 9:
FIG. 9 illustrates an example process for extracting data from any given file, according to some embodiments.

FIG. 9 illustrates an example process 900 for extracting data from any given file, according to some embodiments. In step 902, process 900 extract data by keyword references. Process 900 can identify the extractable text based on the dictionary keyword references. The text identification can be from the top to the bottom of the file. Process 900 can prepare the extracted text according to the dictionary data structure type (e.g. as tabular or text lines). FIG. 10 illustrates an example dictionary data structure that can be used herein, according to some embodiments.

In step 904, process 900 can extract data by zone definition. Process 900 can identify the extractable text based on the dictionary zone (e.g. a specified set of geometry co-ordinates) definition. Process 900 can prepare the extracted text according to the dictionary data structure type (e.g. as tabular or text lines). The text identification can be from top to bottom and left to right side of the file. FIG. 11 illustrates an example of extracting data by a zone definition, according to some embodiments. The zone can be defined with (x, y) plane coordinates.

Figure 12:
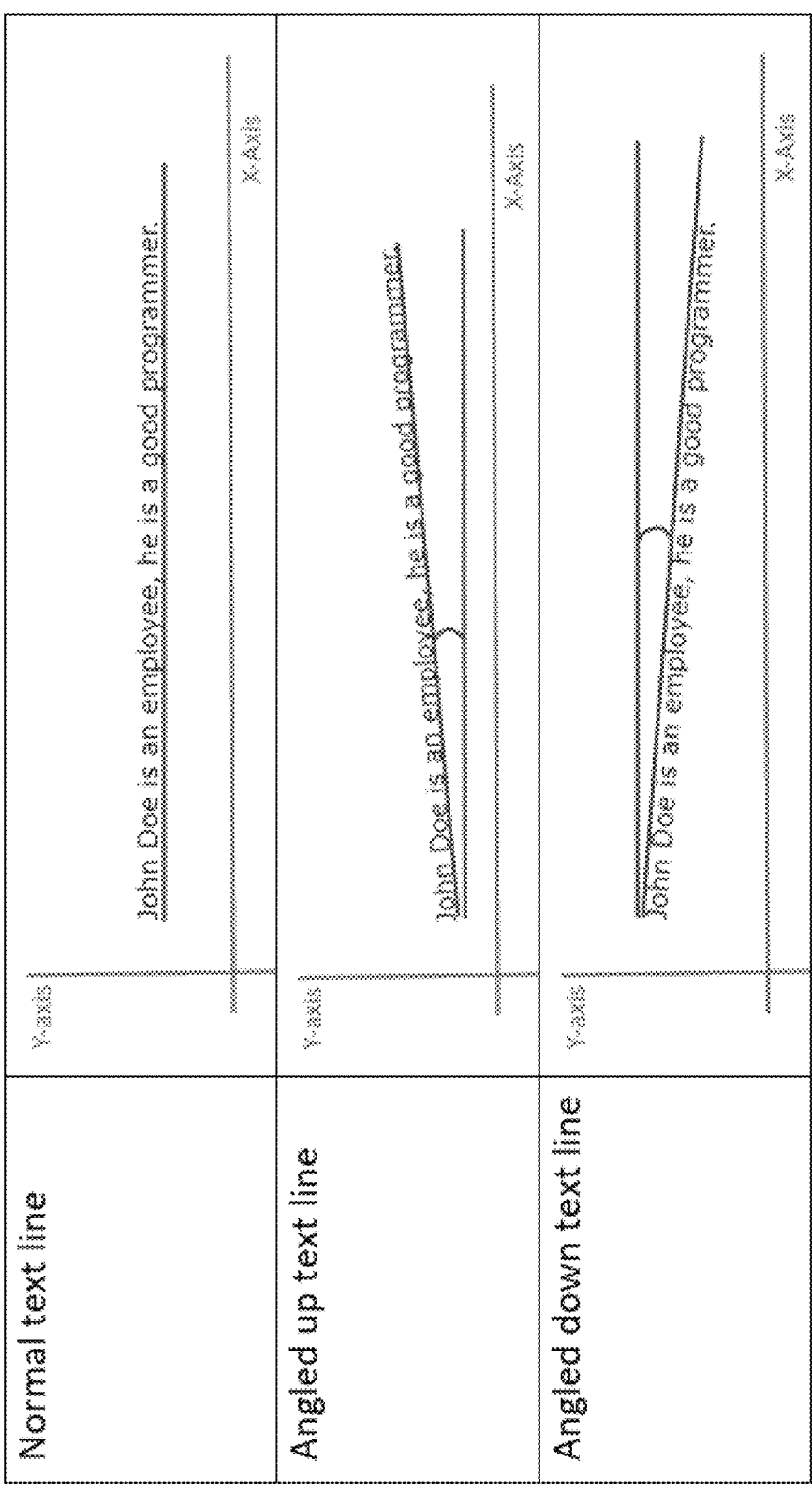
FIG. 12 illustrates an example of angle correction, according to some embodiments.

In step 906, process 900 implements angle correction. It is noted that text lines in the files may not be in exact horizontal angles. If this is detected, then process 900 can the Pythagorean theorem to correct and re-calculate the correct positions of the text. To correct the angle, process 900 utilizes the dictionary of horizontal keywords. FIG. 12 illustrates an example of angle correction, according to some embodiments. Horizontal keywords are now discussed. The system considers minimum two words of any single line, one word is extremely left side, and the second word is the extreme right in the same line. Ideally the angle between these two words would be 0 degrees, if it is not 0 degrees then system will calculate the angle between these two horizontal words and adjusts the rotation of the page till it reaches the 0 degrees.

In step 908, process 900 can implement skew correction. It is noted that when process 200 and/or 900 can receive a skewed file (e.g. from images and/or scanned PDF documents, etc.). Accordingly, process 900 adjusts the file height and width. To correct the skewness, process 900 can use the dictionary of horizontal and vertical keywords.

In step 910, process 900 implements an OCR processor. Process 900 can use a 'Tesseract' OCR engine to obtain a searchable PDF from the given images or scanned PDF files. Process 900 can include a text search engine. Process 900 can encrypt its output.

Process 100-900 can be implemented via a structured API by a cloud-computing platform.

Example Systems

Figure 13:
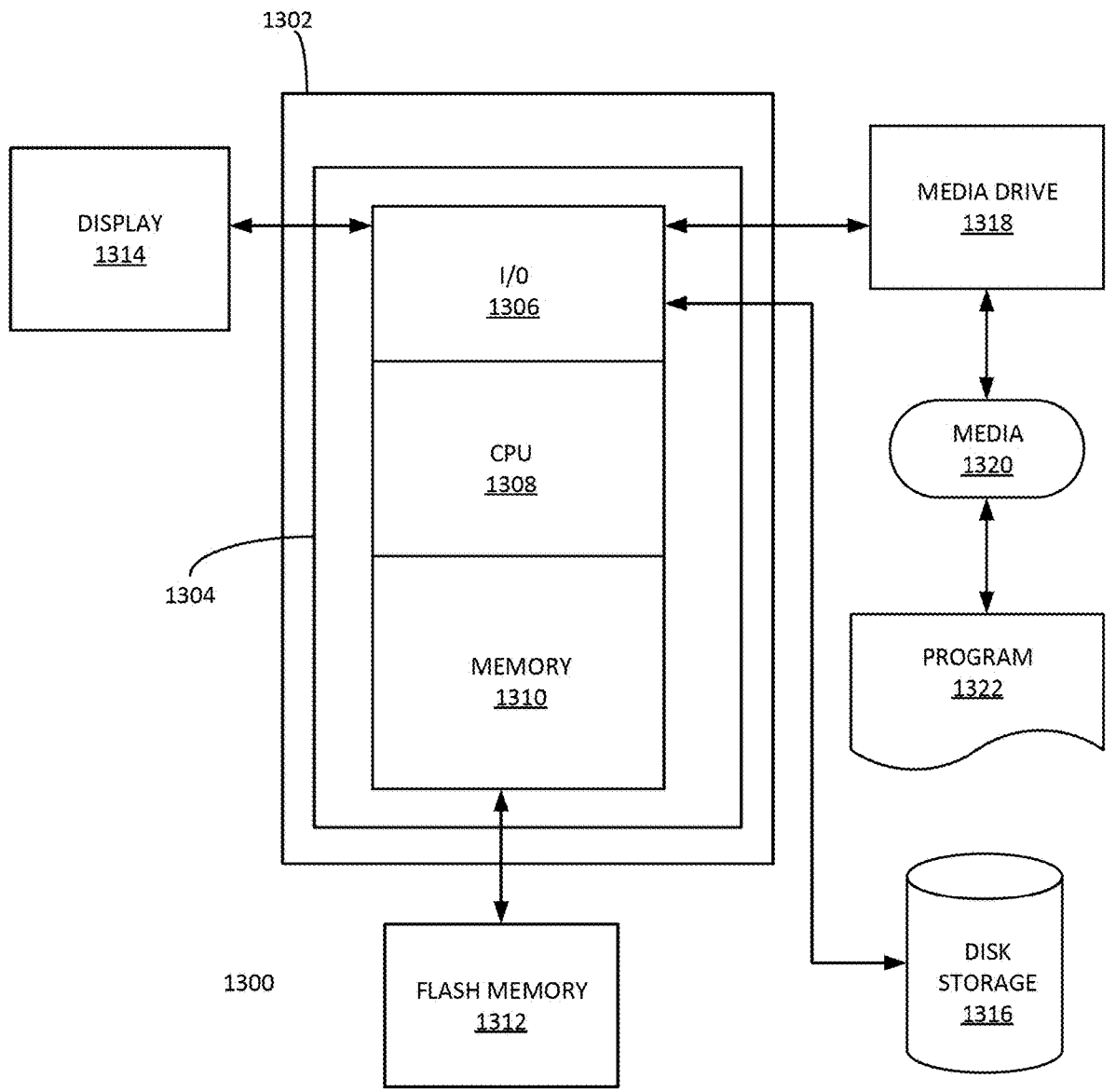
FIG. 13 depicts an exemplary computing system that can be configured to perform any one of the processes provided herein.

FIG. 13 depicts an exemplary computing system 400 that can be configured to perform any one of the processes provided herein. In this context, computing system 1300 may include, for example, a processor, memory, storage, and I/O devices (e.g., monitor, keyboard, disk drive, Internet connection, etc.). However, computing system 1300 may include circuitry or other specialized hardware for carrying out some or all aspects of the processes. In some operational settings, computing system 1300 may be configured as a system that includes one or more units, each of which is configured to carry out some aspects of the processes either in software, hardware, or some combination thereof.

FIG. 13 depicts computing system 1300 with a number of components that may be used to perform any of the processes described herein. The main system 1302 includes a motherboard 1304 having an I/O section 1306, one or more central processing units (CPU) 1308, and a memory section 1310, which may have a flash memory card 1312 related to it. The I/O section 1306 can be connected to a display 1314, a keyboard and/or other user input (not shown), a disk storage unit 1316, and a media drive unit 1318. The media drive unit 1318 can read/write a computer-readable medium 1320, which can contain programs 1322 and/or data. Computing system 1300 can include a web browser. Moreover, it is noted that computing system 1300 can be configured to include additional systems in order to fulfill various functionalities. Computing system 1300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Embodiment

Figure 14:
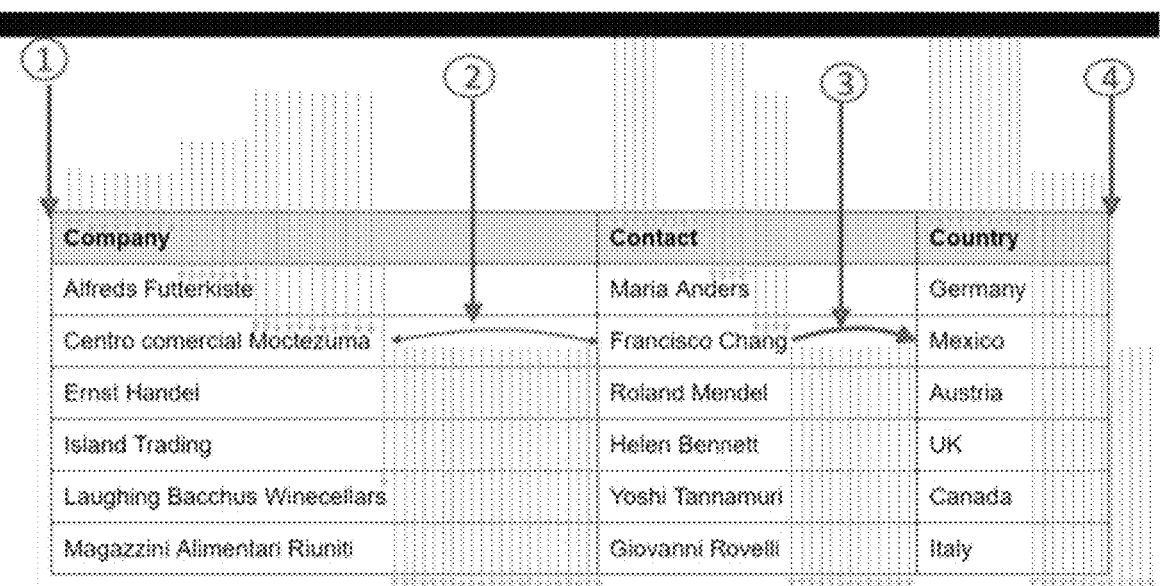

FIGS. 14 and 15 illustrate a read (scan) a table data from the file, according to some embodiments. A read/scan engine can reads/scans the text from top to bottom. The read/scan engine can collect the configured keywords for identifying the table columns boundaries, etc. (e.g. as shown in the FIGS. 14 and 15).

Example Machine Learning Processes

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g. in cross-validation), the test dataset is also called a holdout dataset.

Figure 17:
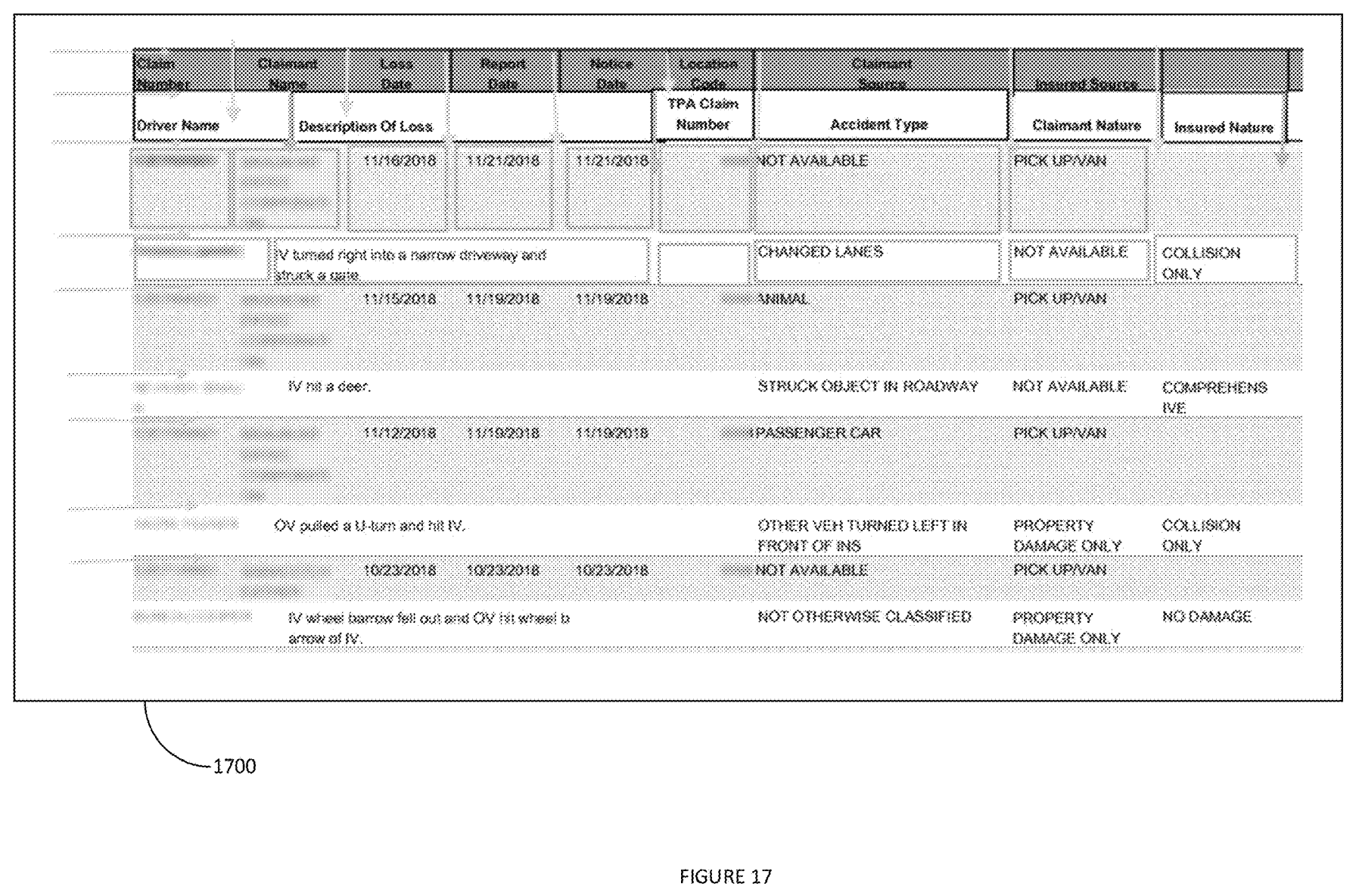

FIGS. 16 and 17 provide example screenshots 1600 and 1700 for implementing an operation to Identify the horizontal separators, according to some embodiments. As shown, the separator can be identified between any two sections of the data. Horizontal scanning is then used to find horizontal line or lines. These separating lines can be used to clearly identify the contextual data along with the 'Vertical scanning' (e.g. see FIG. 14 discussed supra). It is noted that the system identifies all the horizontal lines from the page and ignores the 'White' colored lines. Wherever these horizontal lines are identified then system sends a signal to the main engine to consider the 'Contextual data' ended there and another 'Context' is about to start.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for document extraction workflow for unstructured documents comprising:

with at least one computer processor:

automatically implementing a text mining operation on a set of digital documents by:

defining a document type of each digital document, based on the document type, defining a set of data dictionaries to extract any data from each digital document, using the defined set of data dictionaries to extract any data from each digital document, and wherein the step of using the defined set of data dictionaries to extract any data from each digital document further comprises:

extracting data by keyword references, and extract data by a zone definition, loading the digital document as a Portable Document Format (PDF) file, obtaining the data as text lines from the PDF file, wherein the PDF file is automatically opened in a text editor or a source code editor, defining the set of dictionaries to extract the data from the PDF file, based on the document type of the PDF file, selecting a provider for the data in the PDF file, a category in the PDF file, and a subcategory in the PDF file, identifying the data to be extracted from the PDF, prepare the set of dictionaries that are used to extract the data as a table, converting the prepared set of dictionaries to a JSON file, providing a set of horizontal keywords in the set of data dictionaries, using the set of horizontal keywords in the set of data dictionaries, implementing an angle correction on a text line of text in the PDF file when the text line is not in a horizontal angle by calculating an angle between at least two horizontal key words of the set of horizontal keywords and adjusting a rotation of a digital page comprising the at last two key words until the angle between the at least two key words reaches zero (0) degrees, wherein the set of dictionaries comprises a dictionary of metadata items, wherein the dictionary of metadata items comprises a name metadata item comprising key name in the JSON file, and a data structure type defining a structure of the table, wherein the dictionary of metadata items comprises a key words field comprising a unique list of text words to identify a start and an end point in the PDF file, wherein the dictionary of metadata items comprises a zones field comprising a set of x, y axis coordinates of the text in the PDF file that is extracted, wherein a text identification is performed from a top of the PDF file to a bottom of the PDF file and from a left side of the PDF file to a right side of the PDF file, wherein a skew correction operation is implemented on the PDF file by adjusting a file height and a file width based on the set of horizontal keywords and a set of vertical keywords as provided in the set of data dictionaries comprising the dictionary of metadata items, wherein a optical character recognition (OCR) engine is used to scan the PDF file.

\* \* \* \* \*